US006062635A

United States Patent [19]
Learman et al.

[11] Patent Number: 6,062,635
[45] Date of Patent: May 16, 2000

[54] PLASTIC AIR DUCT INTEGRATED TO HEADLINER

[75] Inventors: Stephen J. Learman, Saline; Edward Curtindale, Farmington Hills; Ronald Reich, Kentwood, all of Mich.

[73] Assignee: Lear Automotive Dearborn, Inc,

[21] Appl. No.: 09/045,007

[22] Filed: Mar. 20, 1998

[51] Int. Cl.[7] .................................................. B60J 7/00
[52] U.S. Cl. ............................................. 296/208; 296/214
[58] Field of Search ................................. 296/214, 39.1, 296/208; 454/108, 137

[56] References Cited

U.S. PATENT DOCUMENTS

| | | | |
|---|---|---|---|
| 3,597,799 | 8/1971 | Earle | 18/19 |
| 3,648,592 | 3/1972 | Nieboer | 98/107 |
| 4,201,122 | 5/1980 | Maciag . | |
| 4,252,053 | 2/1981 | Muto et al. . | |
| 5,383,815 | 1/1995 | Kiesel et al. . | |
| 5,863,370 | 1/1999 | Munro | 156/214 |
| 5,913,566 | 6/1999 | Stauffer et al. | 296/190.1 |

FOREIGN PATENT DOCUMENTS

| | | |
|---|---|---|
| 0 596 234 A1 | 5/1994 | European Pat. Off. . |
| 2 622 514 | 5/1989 | France . |

*Primary Examiner*—D. Glenn Dayoan
*Assistant Examiner*—Lori L. Coletta
*Attorney, Agent, or Firm*—MacMillan, Sobanski & Todd, LLC

[57] ABSTRACT

A plastic air duct is attached to a headliner surface. The plastic air duct is generally u-shaped and communicates air from an air supply to openings through the headliner. The use of the molded plastic part reduces the overall weight and cost of the headliner. Also, the plastic duct can be formed to have precisely designed structure such that a more precise control over the final shape of the duct is provided.

14 Claims, 2 Drawing Sheets

PLASTIC AIR DUCT INTEGRATED TO HEADLINER

BACKGROUND OF THE INVENTION

This invention relates to a plastic air duct which is integrated onto a rear headliner surface to provide the required air flow passages.

In modern vehicles, headliners are typically placed in the vehicle to provide a ceiling covering. More recently, and in particular in larger vehicles such as minivans, air flow vents are mounted through the headliner to deliver air into the cab of the vehicle. Typically, the air flow vents have been provided with air flow from the air circulation system of the vehicle through passages formed between flow distribution members and the ceiling of the vehicle.

More recently, headliners have been manufactured wherein a separate lamina of headliner material is placed onto the rear headliner surface. The flow passages are formed within the separate lamina of headliner material.

Since the lamina is formed of headliner material, it has been somewhat difficult to provide the airflow duct with tight corners, or small air distribution structures such as vanes, or the like. Moreover, the use of the headliner material results in relatively thick duct, increasing both the weight and expense.

It is thus an object of this invention to propose a method for providing an air duct above a headliner which is lighter in weight and less expensive.

SUMMARY OF THE INVENTION

In a disclosed embodiment of this invention, a plastic air duct is mounted on top of a headliner. The duct preferably is generally u-shaped, extending along both sides of the headliner and across the rear of the headliner. An air supply passage supplies air to the duct for distribution to several vent openings cut through the headliner.

In a preferred embodiment of this invention, the duct is vacuum-formed. A vacuum-formed part can be relatively thin and lightweight when compared to other molding techniques. However, in other applications, the plastic duct could be blow-molded, injection molded, or formed of other known plastic molding techniques. In addition, it is preferred that the plastic air duct be formed of ABS plastic, however, other plastics may also be utilized.

Essentially, the inventive part is formed as a solid plastic part molded from an appropriate plastic material. This invention has improvements over the prior art which has used a lamina of headliner material to form the duct. The present invention is able to provide more precise control over the final shape of the duct, and also can provide a much thinner duct. These result in reduced weight, cost and improved air flow properties.

These and other features of the present invention can be best understood from the following specification and drawings, the following of which is a brief description.

DETAILED DESCRIPTION OF THE PREFERRED EMBODIMENT

Figure 1:
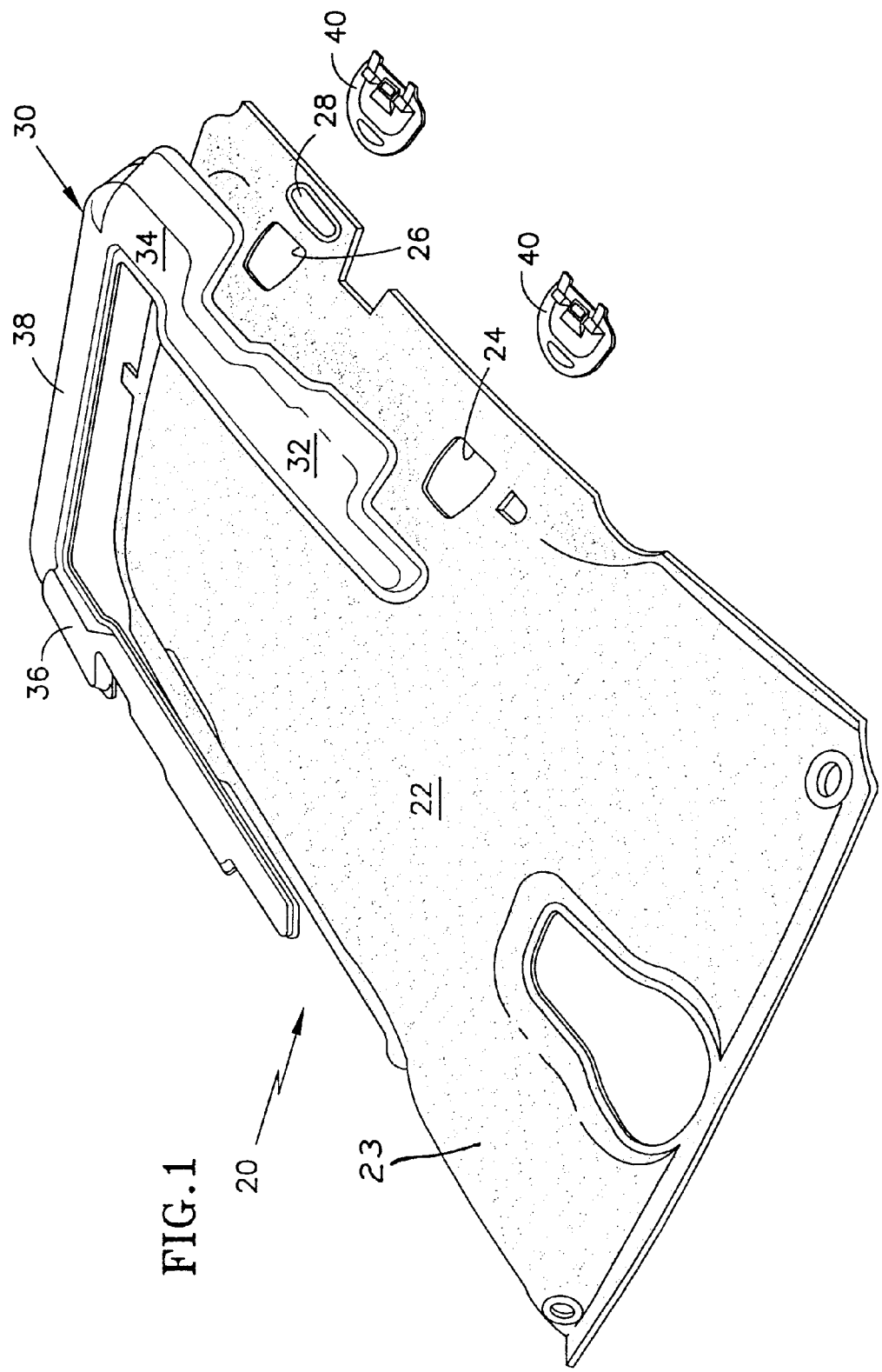
FIG. 1 is an exploded view of a headliner incorporating the present invention.

FIG. 1 shows a headliner assembly 20 including a headliner body 22 with a non-exposed, upper face 23 and an exposed, lower face 25 having vent openings 24 and 26 spaced along one lateral side. There are corresponding vent openings on the opposed lateral side, although they are not visible in this view.

An air supply opening 28 communicates with an air supply vent in the frame of the vehicle. There will not necessarily be a corresponding supply opening on the opposed side of the vehicle.

A plastic air duct 30 is positioned on surface 22 to define the airflow passages. An enlarged vent portion 32 is positioned over vent opening 24 and an enlarged vent portion 34 covers vent portion 26 and supply opening 28. Vent portion 34 is larger then vent portion 32. Vent portion 36 is formed on the opposed side, however, it need not be as large as it need only cover the opening corresponding vent opening 26, and not the supply opening 28. A rear connection portion 38 connects the two sides of duct 30 to provide a generally U-shaped duct. Vents 40 are placed within opening 26 to complete the assembly.

Figure 2:
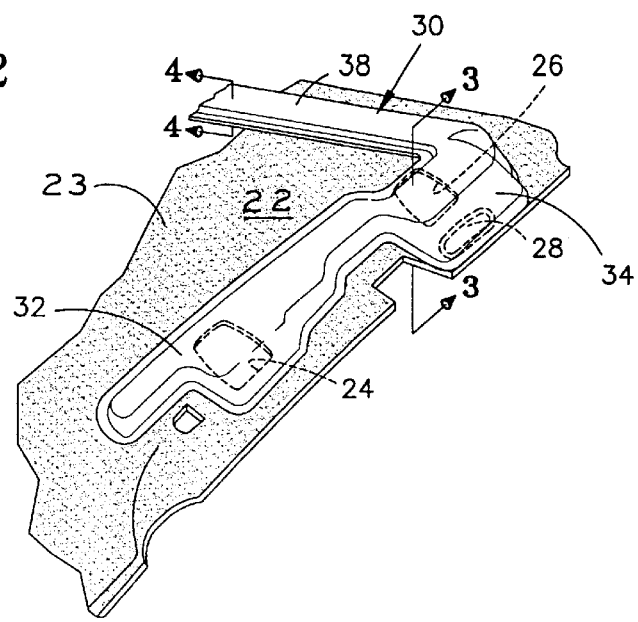
FIG. 2 is a partial cutaway view of the assembled headliner.

As shown in FIG. 2, the air duct 30 is secured to the rear of the headliner body 22 by adhesive or welding techniques, such as vibration, sonic or dielectric welding. Other known connection techniques can be used.

Figure 3:
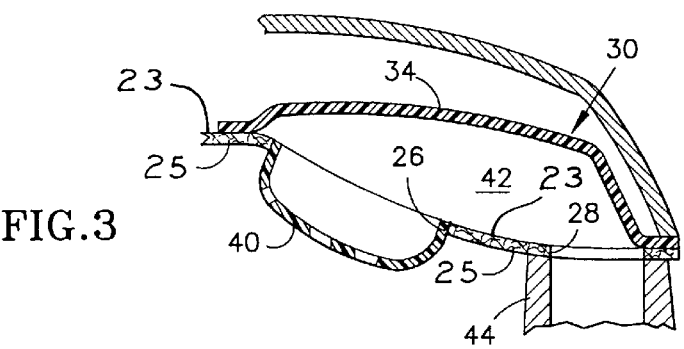
FIG. 3 is a cross-sectional view along line 3—3 as shown in FIG. 2.

As shown in FIG. 3, duct 30 is open at its lower face, and the upper face 23 of the headliner 22 closes off an airflow passage 42 in combination with the duct 30. In this way, air can pass into opening 28 such as from a supply duct 44 formed in the frame of the vehicle, into opening 28 and into the airflow passage 42. From airflow passage 42, air flows to the vent openings 24 and 26 on both lateral sides of the vehicle.

The duct 30 is preferably vacuum-formed from a plastic. Most preferably, it is formed from ABS plastic. Vacuum-forming provides a very thin body which is very lightweight. Alternatively, other molding techniques such as injection or blow molding can be used.

Figure 4:
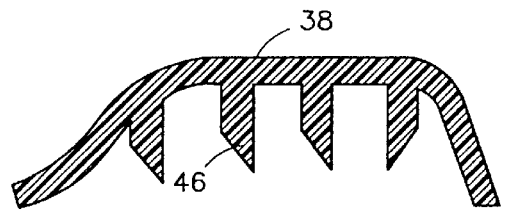
FIG. 4 is a cross-sectional view along line 4—4 as shown in FIG. 2.

FIG. 4 is a cross-section through connection portion 38. As shown, vanes 46 are molded into the part to guide the airflow as desired around the corners of the duct 30. The use of the molding techniques to form duct 30, and the forming of duct 30 from a solid molded plastic part, allows more precise control over the provision of structure, (such as vanes 46) then was obtainable with the prior art lamina duct structure. By the term "solid" as used in this description, Applicant simply means that the part is molded from a relatively thin plastic, rather than formed of a lamina of headliner material. The use of the molded solid plastic part provides valuable benefits for this particular environment.

In addition, the shape of the duct 30 as shown in FIGS. 1 and 2 is quite complex. There are many tight corners in the illustrated duct. Of course, the shape of the duct for any particular headliner application may vary. However, the use of these molding techniques allows the provision of tight control over the shape of the duct, and tight tailoring of the passages within the duct. This provides better airflow control then the prior art headliner lamina structure.

Finally, while the duct 30 is shown as U-shaped, it could be T-shaped, or any other shape depending on the requirements of the particular application.

The present invention thus provides a very lightweight and inexpensive way of forming the airflow ducts on top of a headliner. Also, the use of a molded solid part allows precise control of the shape of the duct.

Although a preferred embodiment of this invention has been disclosed, a worker of ordinary skill in the art would recognize that certain modifications come within the scope of this invention. For that reason, the following claims should be studied to determine the true scope and content of this invention.

We claim:

1. A headliner assembly for a vehicle having a single air supply duct, said headliner assembly comprising:

a headliner body having a non-exposed, upper face with opposed sides, said headliner body including a first vent opening formed on one side of said headliner body and a second vent opening formed on the other side of said headliner body, and further including an air supply opening formed on only one side of said headliner body, the air supply opening being in fluid communication with the single air supply duct of the vehicle; and an air duct positioned on the non-exposed, upper face of said headliner body, said air duct including a first enlarged vent portion positioned over both the first vent opening and the air supply opening on one side of said headliner body, and a second enlarged vent portion positioned over the second vent opening on the other side of said headliner body, said air duct further including a connection portion providing fluid communication between the first and second enlarged vent portions, wherein air provided by the single air supply duct passes through the air supply opening and through the first and second vent openings on both sides of said headliner body.

2. The headliner assembly according to claim 1, wherein the connection portion of said air duct includes at least one vane for guiding a flow of air through said air duct.

3. The headliner assembly according to claim 2, wherein the at least one vane is integrally molded to the connection portion of said air duct.

4. The headliner assembly according to claim 1, wherein said air duct is vacuum-formed from plastic material.

5. The headliner assembly according to claim 4, wherein said air duct is vacuum-formed from ABS plastic material.

6. A headliner assembly for a vehicle having a single air supply duct, said headliner assembly comprising:

a headliner body having a non-exposed, upper face with opposed sides, said headliner body including a first vent opening formed on one side of said headliner body and a second vent opening formed on the other side of said headliner body, and further including an air supply opening formed on only one side of said headliner body, the air supply opening being in fluid communication with the single air supply duct of the vehicle; and a generally U-shaped channel positioned on the non-exposed, upper face of said headliner body and cooperating therewith to form an air duct therebetween, said air duct including a first vent portion having a first opening being positioned over the first vent opening and a third opening being positioned over the single air supply duct of the vehicle, and a second vent portion having a second opening being positioned over the second vent opening on the other side of said headliner body, said air duct further including a connection portion providing fluid communication between the first and second vent portions, wherein air provided by the single air supply duct passes through the air supply opening and into the air duct and through the first and second vent openings on both sides of said headliner body.

7. The headliner assembly according to claim 6, wherein the connection portion of said air duct includes at least one vane for guiding a flow of air through said air duct.

8. The headliner assembly according to claim 7, wherein the at least one vane is integrally molded to the connection portion of said air duct.

9. The headliner assembly according to claim 6, wherein said air duct is vacuum-formed from plastic material.

10. The headliner assembly according to claim 9, wherein said air duct is vacuum-formed from ABS plastic material.

11. A method of integrally forming a headliner assembly comprising the steps of:

a) providing a headliner body having a non-exposed, upper face with opposed sides, said headliner body including a first vent opening formed on one side of said headliner body and a second vent opening formed on the other side of said headliner body, and further including an air supply opening formed on only one side of said headliner body, the air supply opening being in fluid communication with the single air supply duct of the vehicle;

b) providing a generally U-shaped channel positioned on the non-exposed, upper face of said headliner body and cooperating therewith to form an air duct therebetween, said air duct including a first vent portion having a first opening being positioned over the first vent opening and a third opening being positioned over the single air supply duct of the vehicle, and a second vent portion having a second opening being positioned over the second vent opening on the other side of said headliner body, said air duct further including a connection portion providing fluid communication between the first and second vent portions, wherein air provided by the single air supply duct passes through the air supply opening and into the air duct and through the first and second vent openings on both sides of said headliner body.

12. The method according to claim 11, further comprising the step of integrally molding at least one vane to the connection portion of said air duct for guiding a flow of air through said air duct.

13. The method according to claim 11, further comprising the step of vacuum-forming said air duct from plastic material.

14. The method according to claim 13, wherein said air duct is vacuum-formed from ABS plastic material.

* * * * *